(12) United States Patent
West (10) Patent No.: US 8,672,594 B1
(45) Date of Patent: Mar. 18, 2014

(54) HAULING APPARATUS, SYSTEM, AND METHOD OF USE

(71) Applicant: Larry West, Columbus, IN (US)

(72) Inventor: Larry West, Columbus, IN (US)

( * ) Notice: Subject to any disclaimer, the term of this patent is extended or adjusted under 35 U.S.C. 154(b) by 0 days.

(21) Appl. No.: 13/687,251

(22) Filed: Nov. 28, 2012

(51) Int. Cl.
    *B60P 7/08*    (2006.01)
(52) U.S. Cl.
    USPC ............... 410/35; 410/36; 410/42; 410/47; 410/48; 410/100
(58) Field of Classification Search
    USPC ............ 410/34–38, 40, 42, 46–50, 81, 100; 211/85.18; 206/394, 397, 446
    See application file for complete search history.

(56) References Cited

U.S. PATENT DOCUMENTS

| | | | | |
|---|---|---|---|---|
| 1,739,354 A | * | 12/1929 | Evans et al. | ........... 410/48 |
| 2,810,602 A | | 10/1957 | Abrams | |
| 3,291,072 A | | 12/1966 | Cunningham | |
| 3,353,506 A | | 11/1967 | Snyder | |
| 3,481,627 A | | 12/1969 | Felbum | |
| 3,605,638 A | | 9/1971 | James | |
| 5,211,518 A | | 5/1993 | Mimica | |
| 5,343,813 A | | 9/1994 | Septer | |
| 5,401,129 A | | 3/1995 | Eatinger | |
| 5,425,608 A | | 6/1995 | Reitnouer | |
| 5,476,348 A | * | 12/1995 | Shelleby | ........... 410/49 |
| 5,577,619 A | | 11/1996 | Callahan | |
| 5,622,116 A | | 4/1997 | Carlton | |
| 6,190,100 B1 | | 2/2001 | Mawji | |
| 6,923,608 B2 | | 8/2005 | Rediehs | |
| 7,628,418 B1 | | 12/2009 | Holmes | |

* cited by examiner

*Primary Examiner* — Stephen Gordon
(74) *Attorney, Agent, or Firm* — Roberts IP Law; John Roberts (57) ABSTRACT

Provided are hauling apparatus, systems, and methods adapted to securely transport on a standard flatbed trailer or other structure a plurality of objects up to several feet across having open center portions and curved outer surfaces and weighing up to thousands of pounds each, such as metal coils. A first apparatus is adapted to be removably attached to a standard flatbed trailer or the like, and includes an abutment structure extending upward from a longitudinally extending base that may include specially angled support structures adapted to securely carry the curved cargo. The abutment structure is connected to a movable abutting apparatus by a tensioner structure that passes through the open center portions of the objects without touching those objects. The objects are then secured to the hauling apparatus by tightening the tensioner structure, which causes the objects to be compressed between the abutment structure and movable abutting apparatus.

17 Claims, 9 Drawing Sheets

HAULING APPARATUS, SYSTEM, AND METHOD OF USE

CROSS-REFERENCE TO RELATED APPLICATIONS

None.

FEDERALLY SPONSORED RESEARCH OR DEVELOPMENT

None.

TECHNICAL FIELD

The present invention pertains to an apparatus, system, and method for hauling relatively large, heavy objects, and in particular heavy objects with curved outer surfaces and open central portions, such as metal coils, pipes, concrete shapes, and the like.

BACKGROUND

There have been numerous attempts over many decades to find an economical, practical, and safe solution to the problems presented by hauling relatively large, heavy objects, and in particular heavy objects with curved outer surfaces, such as metal coils, pipes, structures, concrete shapes, and the like. The default method of hauling such items is to chain them down to a conventional flatbed trailer, as shown for example in FIG. 1. However, this presents important practical and safety issues when hauling large, heavy objects having curved outer surfaces, because those objects tend to roll, tip over, and become dislodged, which at a minimum can damage the cargo, and can easily prove fatal to the driver or others on the road. Accordingly, specialized trailers have been designed, for instance to allow particular curved objects to nest into the trailer. See for example the following United States patents, all of which are incorporated herein by reference: U.S. Pat. No. 2,810,602 issued 1957 Oct. 22 to Abrams; U.S. Pat. No. 3,291,072 issued 1966 Dec. 13 to Cunningham; U.S. Pat. No. 3,353,506 issued 1967 Nov. 21 to Snyder; U.S. Pat. No. 3,481,627 issued 1969 Dec. 2 to Felburn; U.S. Pat. No. 3,605,638 issued 1971 Sep. 20 to James; U.S. Pat. No. 5,211,518 issued 1993 May 18 to Mimica; U.S. Pat. No. 5,343,813 issued 1994 Sep. 6 to Septer; U.S. Pat. No. 5,401,129 issued 1995 Mar. 28 to Eatinger; U.S. Pat. No. 5,425,608 issued 1995 Jun. 20 to Reitnouer; U.S. Pat. No. 5,577,619 issued 1996 Nov. 26 to Callahan; U.S. Pat. No. 5,622,116 issued 1997 Apr. 22 to Carlton; U.S. Pat. No. 6,190,100 B1 issued 2001 Feb. 20 to Mawji; U.S. Pat. No. 6,923,608 B2 issued 2005 Aug. 2 to Rediehs; and U.S. Pat. No. 7,628,418 B1 issued 2009 Dec. 8 to Holmes. These specialized trailer designs and similar complex systems may address some of the safety problems in theory, but as a practical matter such designs and systems are typically not used. Such designs have never gained acceptance over conventional flatbed trailers due to their cost, complexity, and lack of ready availability compared to the ubiquitous flatbed trailer, which already exists and is not limited to any special uses. Thus, even in view of the well-documented safety hazards, flatbed trailers and chains continue to be the primary method of hauling heavy objects with curved outer surfaces, such as metal coils, pipes, structures, concrete shapes, and the like.

Figure 1:
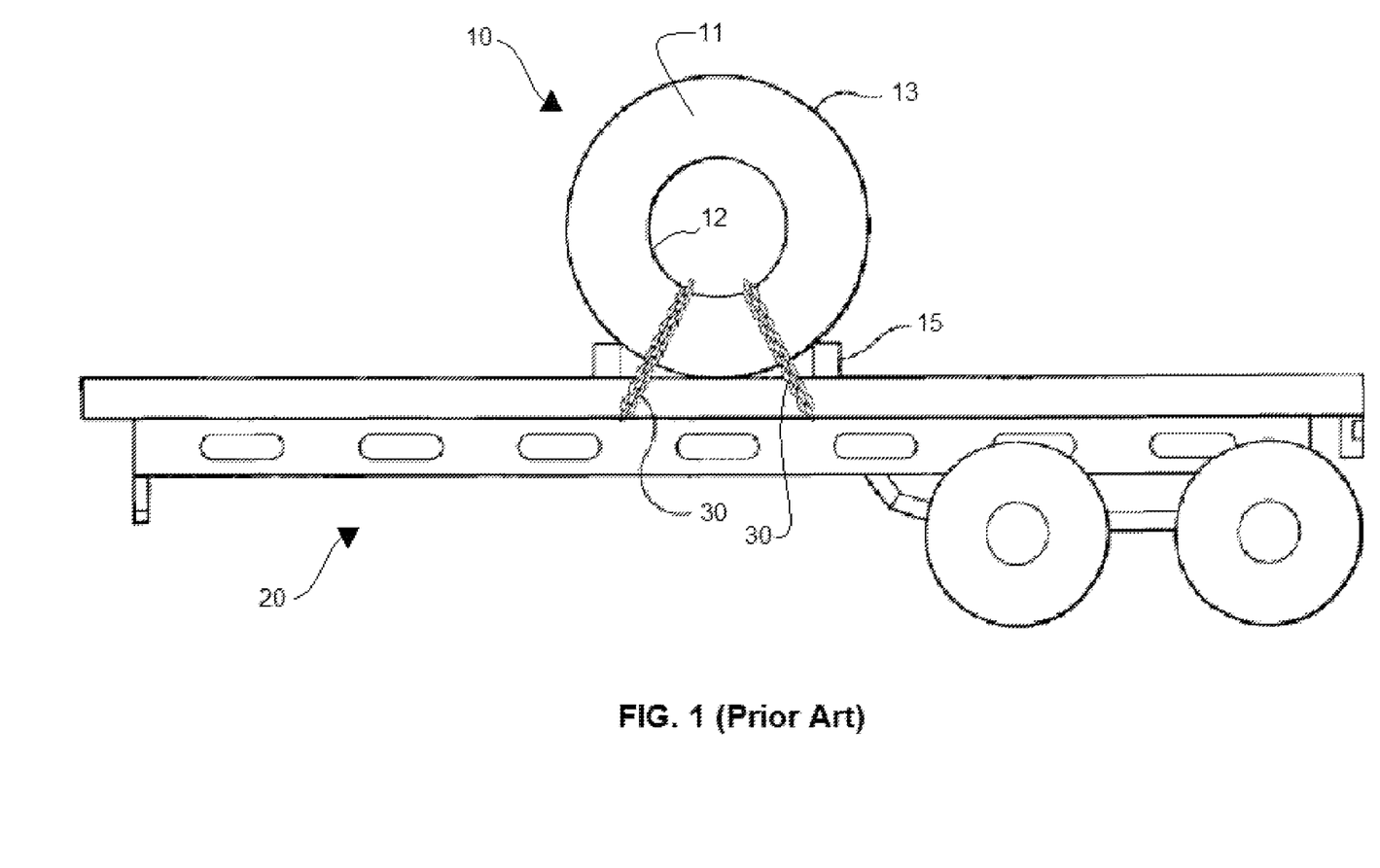
FIG. 1 is a side elevation view of a typical prior art hauling system.

Further considerations are raised when hauling one or more metal coils such as steel or aluminum, which comprise a winding of metal sheeting which is coiled for convenient bulk transport, storage, and subsequent processing. As shown in FIG. 1, such metal coils 10 are typically quite massive, and are usually hauled upright such that the curved outer diameter 13 is supported directly on the flatbed trailer 20, with chains 30 attached to the trailer 20 and running through the central open portion of the coil 10 and pressing downward with great pressure on the curved inner diameter 12 of the coil 10. The coils 10 are preferably hauled upright instead of flat-face down to facilitate loading and unloading using a forklift fork or similar device placed inside the central opening in the coil 10. Pieces of wood 15 are often wedged under the sides of the curved outer diameter 13 in an attempt to stop the coil 10 from rolling, such that the adjoining corner of the wood 15 places high pressure on the mating surface 13 of the coil 10. Due to the mass of the coil 10, this hauling system results in high pressure being applied to local portions of the metal coil 10, which is amplified as the coil 10 shifts or rocks during transport. This frequently damages the inner 12 and/or outer 13 surfaces of the coil 10, rendering a number of windings bent, scuffed, and unusable. With current manufacturing techniques, including "just-in-time" manufacturing and zero-defect quality controls, consumers of metal coils have demanded that the coils be shipped without damage of virtually any kind, so that the coils can be unloaded and set up at the last minute in a manufacturing operation, with little to no waste. Accordingly, a strong need remains for a better way of hauling relatively large, heavy objects with curved outer surfaces, that is practical and sufficiently economically feasible that it will be actually adopted by industry.

Figure 2:
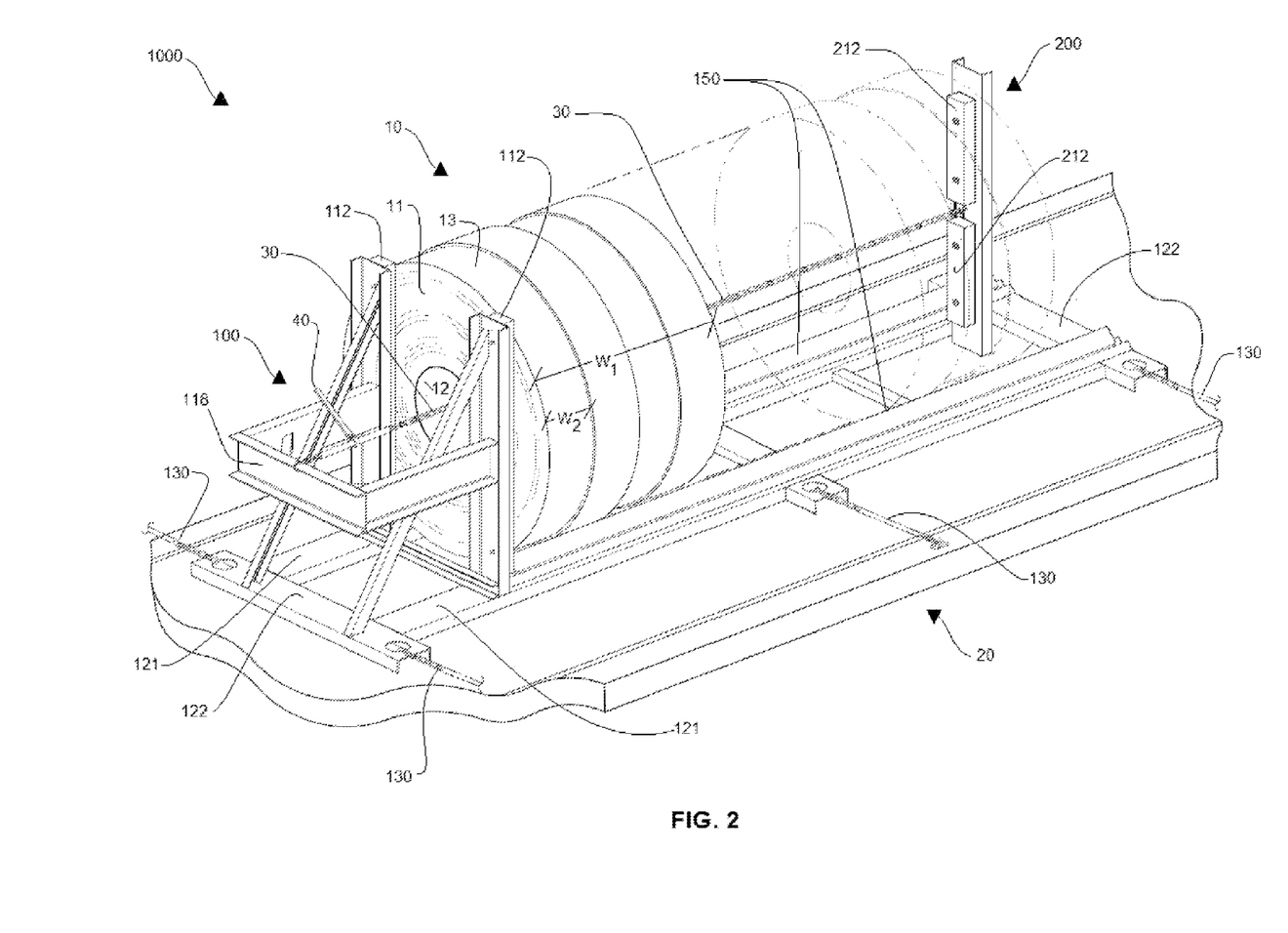
FIG. 2 is an isometric view of an example hauling system according to certain example embodiments.

Another challenge that has arisen in connection with "just in time" and "lean" manufacturing is that end-users of metal coils are demanding that they be delivered in their final widths for subsequent manufacturing processes, which are often thinner, sometimes much thinner, than the standard widths normally shipped. For example, as shown in FIG. 2, whereas a conventional metal coil might have width W1, customers are requesting delivery of metal coils having narrower widths W2. This makes the coils 10 much more unstable and likely to tip over, increasing the dangers associated with shipment along with the likelihood of damage due to movement during shipping, including relative movement between adjacent coils that can damage the outer edges 11 of the coiled metal. A simple, relatively inexpensive, and easy-to-adopt solution is needed to address these challenges.

SUMMARY

The present invention elegantly solves all the above challenges and provides numerous additional benefits in various example embodiments. The invention is set forth only in the claims, and the following summary descriptions of certain examples are not in any way to limit, define or otherwise establish the scope of legal protection.

In certain example embodiments the present apparatus, system, and method of use may comprise a hauling system adapted to securely transport on a standard flatbed trailer a plurality of objects up to several feet across having open center portions and curved outer surfaces and weighing up to thousands of pounds each, the system comprising: a first apparatus adapted to be removably attached to a flatbed trailer, the first apparatus comprising an abutment structure having one or more first abutment surfaces extending upward from a front portion of a longitudinally extending base that is adapted to securely carry proximate to the first abutment surfaces a plurality of adjacent objects up to several feet across that have curved outer surfaces and weigh up to thousands of pounds each, the abutment structure further comprising a first tensioner attachment structure; a second apparatus comprising a longitudinally extending movable member having one or more second abutment surfaces and a second tensioner attachment structure; and a tensioner structure adapted to attach to the first and second tensioner attachment structures and to pull the movable member toward the abutment structure thereby securing the objects between the first and second abutment surfaces, the tensioner structure further adapted to pass through the open center portions of the objects without touching the objects when the objects are placed adjacent each other on the base proximate the first abutment surfaces and the movable member is placed proximate the side of the objects opposite the side proximate the first abutment surfaces, and when the tensioner structure is attached to the first and second tensioner attachment structures and pulls the movable member toward the abutment structure thereby securing the objects between the first and second abutment surfaces.

In addition to the overall system described in one example above, various aspects of the system are also provided individually and in conjunction with each other. For instance, the first apparatus may comprise an abutment structure that includes a first tensioner attachment structure adapted to pull a movable member toward the abutment structure and thereby secure the objects between the first abutment surfaces and the movable member when the first tensioner attachment structure is connected with a tensioner that passes through the open center portions of the objects without touching the objects when the objects are placed adjacent each other on the base proximate the first abutment surfaces and the movable member is placed proximate the side of the objects opposite the side proximate the first abutment surfaces, and when the tensioner structure is also attached to the movable member and pulls the movable member toward the abutment structure.

In various example embodiments the base may further comprise longitudinally extending cargo support members adapted to have the objects rest thereon, the cargo support members having substantially flat surfaces that are rotated at a non-level angle about their longitudinal axis. The base may further comprise support positioners that position the support members at the non-level angle. The cargo support members may comprise standard four-by-four pieces of lumber. The support positioners may comprise two adjacent pieces of angle iron. Any of the first or second abutment surfaces may comprise a standard two-by-four piece of lumber. The tensioner structure may comprise a chain and a chain binder, such as a ratcheting chain binder. The objects the system is adapted to haul include metal coils.

Also provided are methods of use, including a method of securely transporting on a standard flatbed trailer a plurality of objects up to several feet across having open center portions and curved outer surfaces and weighing up to thousands of pounds each, the method comprising the steps of: providing a hauling system adapted to securely transport on a standard flatbed trailer a plurality of objects up to several feet across having open center portions and curved outer surfaces and weighing up to thousands of pounds each, the system comprising any or all of those features described above; placing the first apparatus on a flatbed trailer; removably attaching the first apparatus to a flatbed trailer; placing one or more objects adjacent each other and proximate the first abutment surfaces, the objects being up to several feet across, having curved outer surfaces, open center portions, and weighing up to thousands of pounds each; placing the movable member proximate the side of the objects opposite the side proximate the first abutment surfaces; passing the tensioner structure through the open center portions and attaching the tensioner structure to the first and second tensioner attachment structures; and pulling the movable member toward the abutment structure, thereby securing the objects between the first and second abutment surfaces without the tensioner structure touching the objects. The objects may include metal coils, and the step of placing the first apparatus on a flatbed trailer may comprise lifting and moving the first apparatus with a forklift so that the front portion of the first apparatus faces in the primary direction of travel of the trailer.

Further details regarding example embodiments of the invention are provided below with reference to the accompanying example figures. Additional aspects, alternatives and variations as would be apparent to persons of skill in the art are also disclosed herein and are specifically contemplated as included as part of the invention, which is limited not by any example but only by the claims.

BRIEF DESCRIPTION OF THE DRAWINGS

The following figures illustrate certain aspects of example embodiments of the invention.

FIG. 8A-1 is a closer view of portion A of FIG. 8.

FIG. 8A-2 is a closer view of portion A of FIG. 8, shown with member 150 removed.

DETAILED DESCRIPTION OF EXAMPLE EMBODIMENTS

Reference is made herein to some specific examples of the present invention, including any best modes contemplated by the inventor for carrying out the invention. Examples of these specific embodiments are illustrated in the accompanying drawings. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, certain specific details are set forth to provide a thorough understanding of the present invention. Particular example embodiments of the present invention may be implemented without some or all of these specific details. In other instances, device features well known to persons of skill in the art have not been described in detail in order to not obscure unnecessarily the present invention. The invention is scalable, and is not limited to any particular dimensions or geometries except where specifically claimed.

Figure 4:
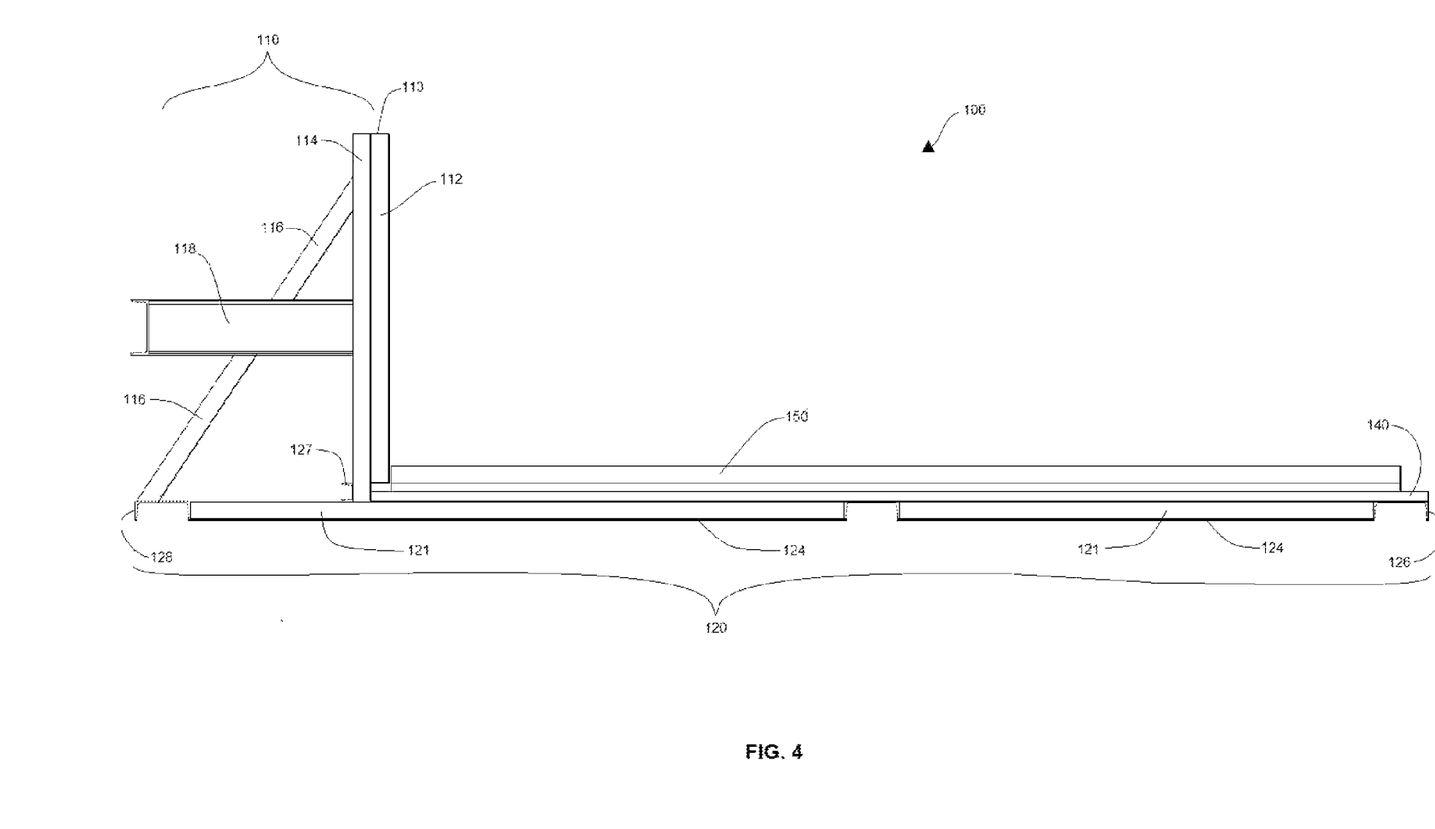
FIG. 4 is side elevation view of the example hauling apparatus of FIG. 3 according to certain example embodiments.
Figure 9:
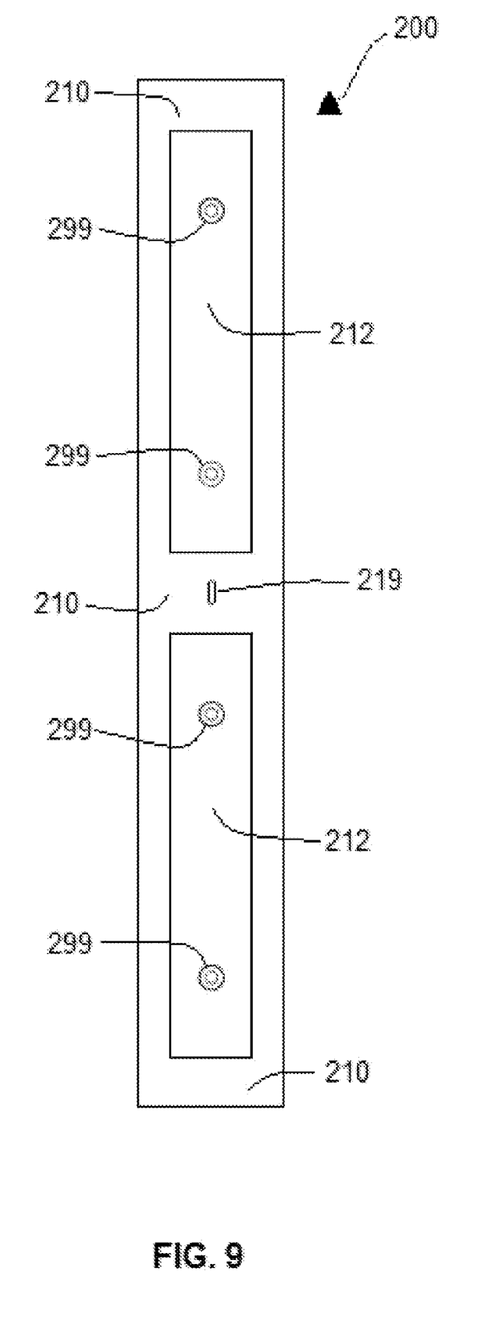
FIG. 9 is a front elevation view of an example hauling apparatus forming part of the example hauling system of FIG. 2 according to certain example embodiments.
Figure 10:
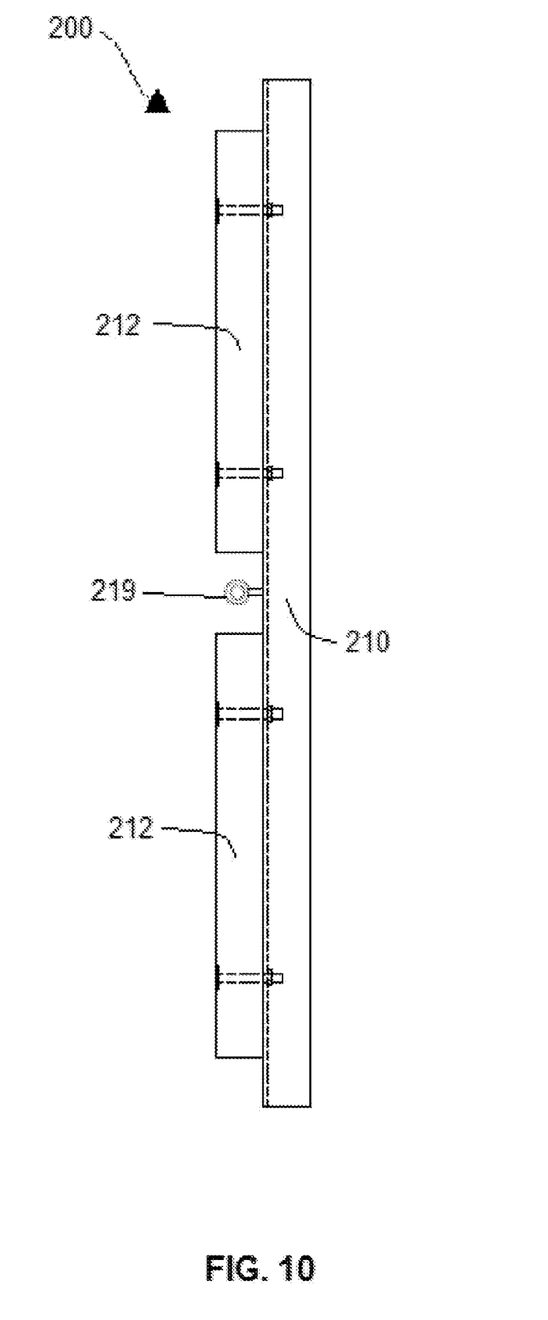
FIG. 10 is a side elevation view of the example hauling apparatus of FIG. 9 according to certain example embodiments.

Example aspects, components and features of various embodiments of the present hauling apparatus, system, and method of use are illustrated in FIGS. 2 through 10 and are described below. An example embodiment of the overall system will first be described generally. Turning to FIG. 2, depicted is an example hauling system 1000 removably attached with chains 130 to a conventional flatbed trailer 20. Alternatively, the system 1000 could be removably attached with straps, cables, fasteners, brackets, or any other suitably strong means, or could be permanently or semi-permanently attached to the trailer 20 or any other suitable surface, like a train car, storage rack system, a floor, the ground, or any other surface or structure. With reference to FIGS. 2 and 4, example hauling system 1000 may comprise a first apparatus, in this example embodiment a rack 100 comprising an abutment structure 110 having one or more abutment surfaces 112, the abutment structure 110 attached to or with a base 120 on which relatively large, heavy objects with curved outer surfaces may be placed. In certain embodiments those objects may comprise metal coils 10 having an outer diameter 13 up to several feet and weighing up to several thousand pounds each. With reference to FIGS. 2, 9, and 10, example hauling system 1000 further comprises a second apparatus, in this example embodiment a movable member 200 comprising one or more abutment surfaces 212. Example hauling system 1000 further comprises means for retracting the movable member 200 toward the abutment structure 110, in this example embodiment a conventional chain 30 attached to a conventional chain binder such as a lever chain binder or a ratcheting chain binder 40. In other embodiments the chain 30 could be replaced with one or more straps, cables, ropes, steel bars or other metal structures, or any other suitably strong means, and the ratcheting chain binder could be replaced with any other mechanisms or means that draws the movable member 200 toward the abutment structure 110 shown in FIG. 4. With reference to FIG. 2, when one or more coils 10 or other relatively large, heavy objects with curved outer surfaces (herein collectively or alternatively "cargo") are placed on the base 120 of the rack 100 adjacent the abutment surfaces 112 of the abutment structure 110, and when the movable member 200 is placed on the side of the cargo opposite the abutment structure 110, and then retractably attached with the abutment structure 110, for instance by a chain 30 with a shortening or retracting mechanism such as a ratcheting mechanism 40, then, by retracting the movable member 200 the cargo is forced toward the abutment structure 110 and becomes rigidly affixed together and compressed between the opposing abutment surfaces, 112, 212. By being rigidly affixed together and to the rack 100, the cargo, in this example metal coils 10, is safely restrained and cannot move appreciably relative to each other or to the mating abutment surfaces 112, 212, no matter how thin (W2) the coils are. And due to the unique designs provided herein, this result may be obtained without the chain 30 or other retraction means touching the cargo at all, for instance by passing the chain 30 through a central open portion of the cargo, as shown in FIG. 2. Accordingly, the chain 30 cannot damage the cargo, unlike conventional methods of attaching such cargo to a flatbed trailer, as shown in FIG. 1. A similar result could be obtained in alternative embodiments by having two or more retracting means, such as chain 30 and tensioner 40 combinations, located radially beyond the outside diameter 13 of the cargo, such as coils 10, by being attached on one end with the outer portions of one or more movable members 200 that extend beyond the outside diameter 13 of the cargo, and being attached on the other end with portions of the abutment structure 110 that extend beyond the outside diameter 13 of the cargo (not shown). However, when the cargo has a centrally located open portion, it is simpler to just use one retracting means, such as a chain 30 and tensioner 40 combination, running through the central portion of the cargo, such as shown in FIG. 2.

Figure 3:
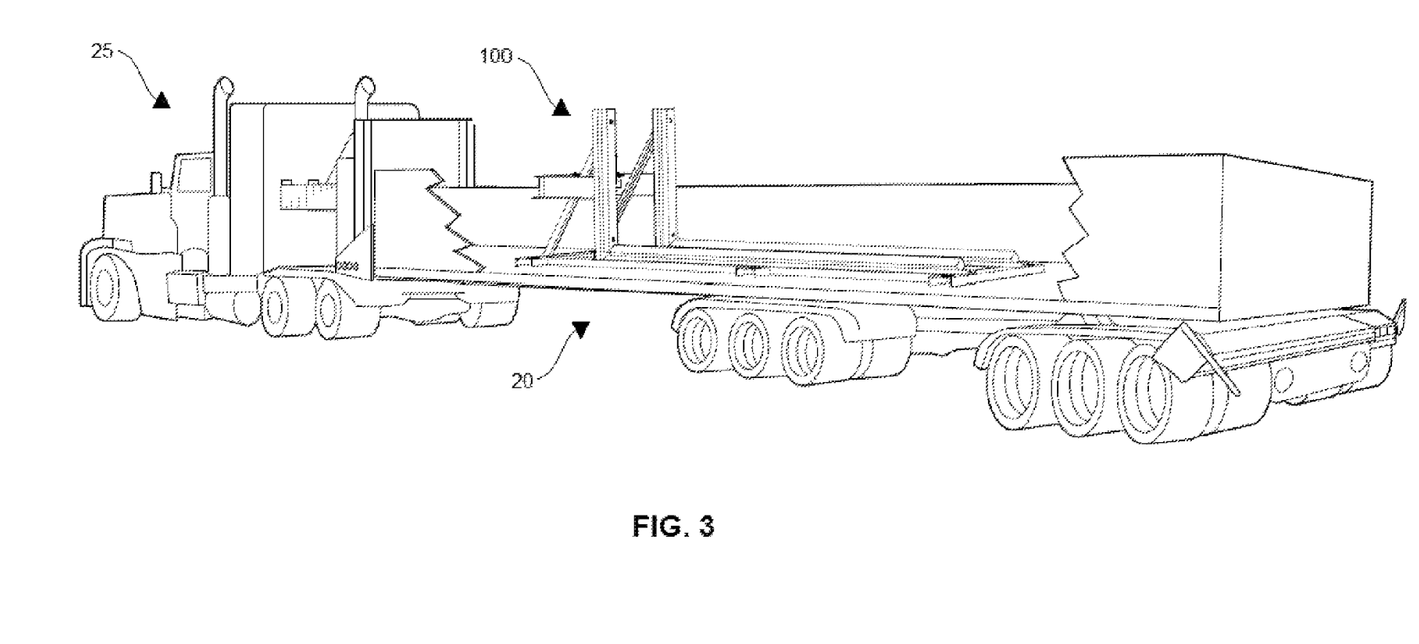
FIG. 3 is an isometric view of an example hauling apparatus forming part of the example hauling system of FIG. 2 according to certain example embodiments, loaded onto a flatbed trailer having a protective surround, shown partially cut away.
Figure 5:
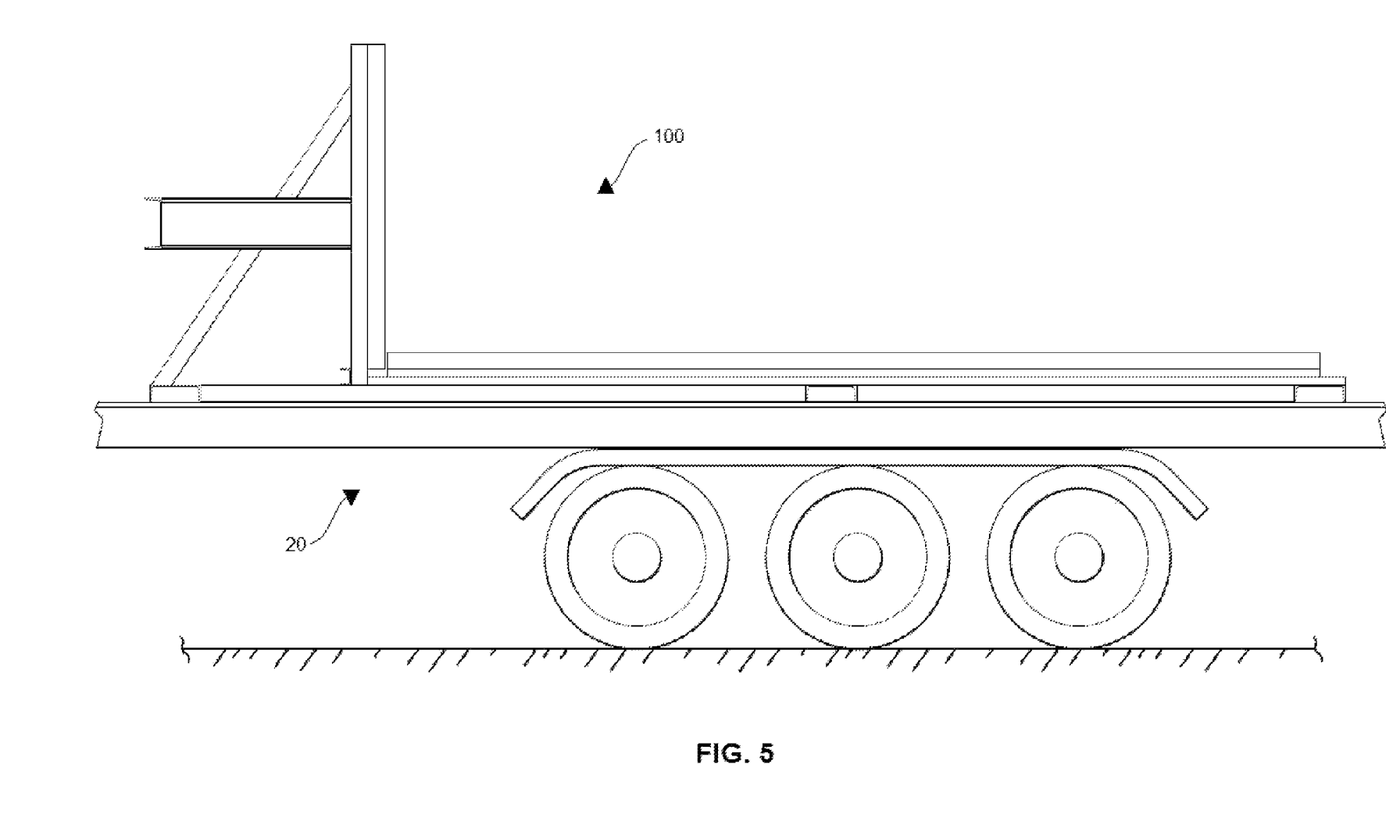
FIG. 5 is a side elevation view of the example hauling apparatus of FIG. 3 according to certain example embodiments, loaded onto a flatbed trailer, shown partially cut away.
Figure 6:
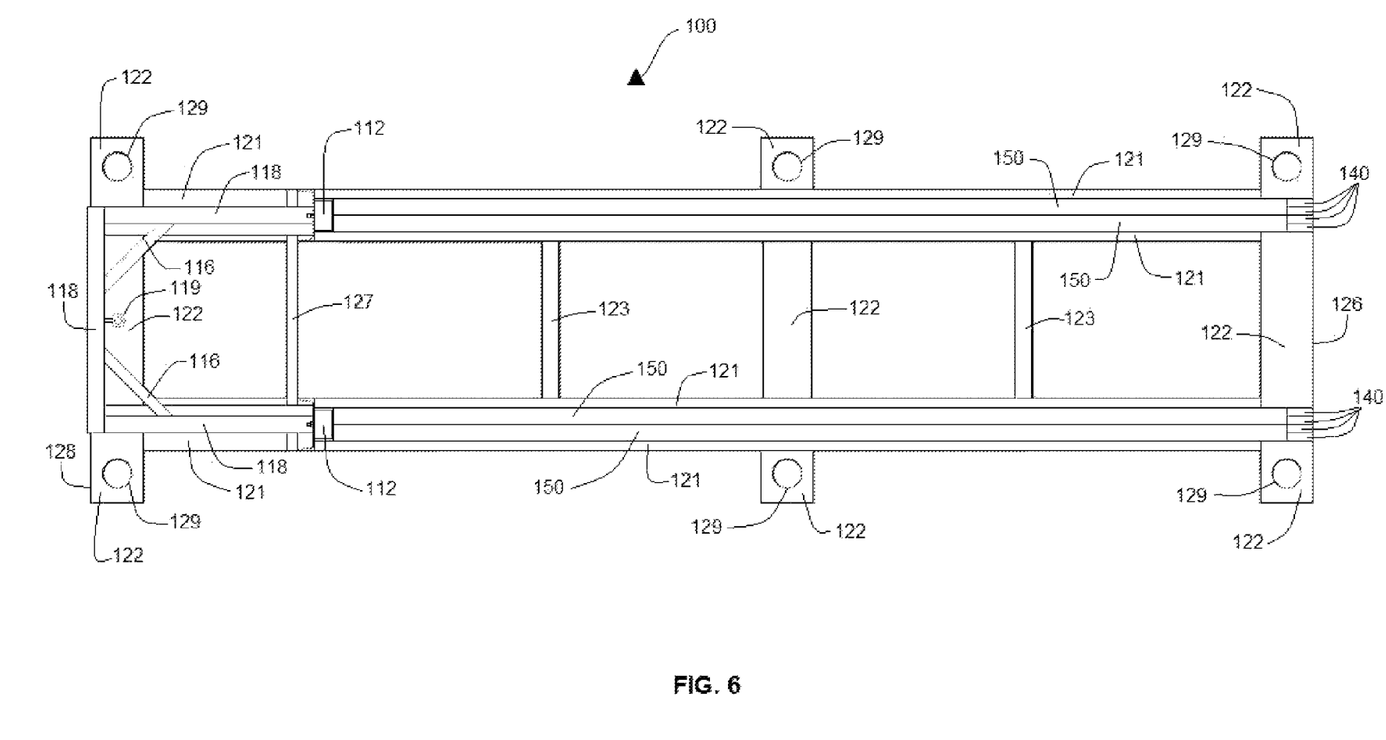
FIG. 6 is a top plan view of the example hauling apparatus of FIG. 3 according to certain example embodiments.
Figure 7:
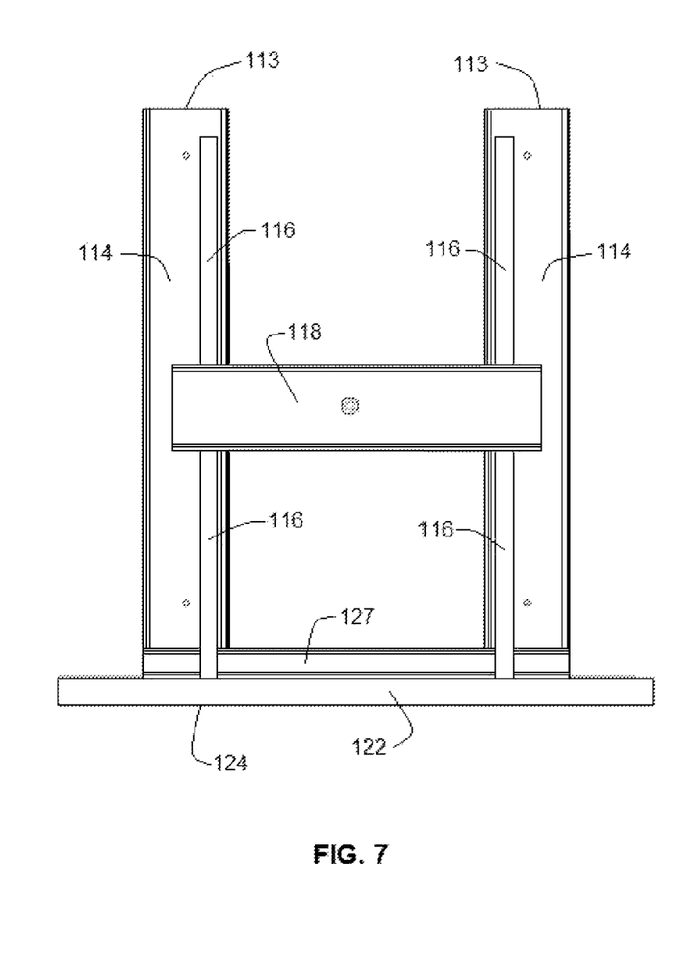
FIG. 7 is a front elevation view of the example hauling apparatus of FIG. 3 according to certain example embodiments.
Figure 8:
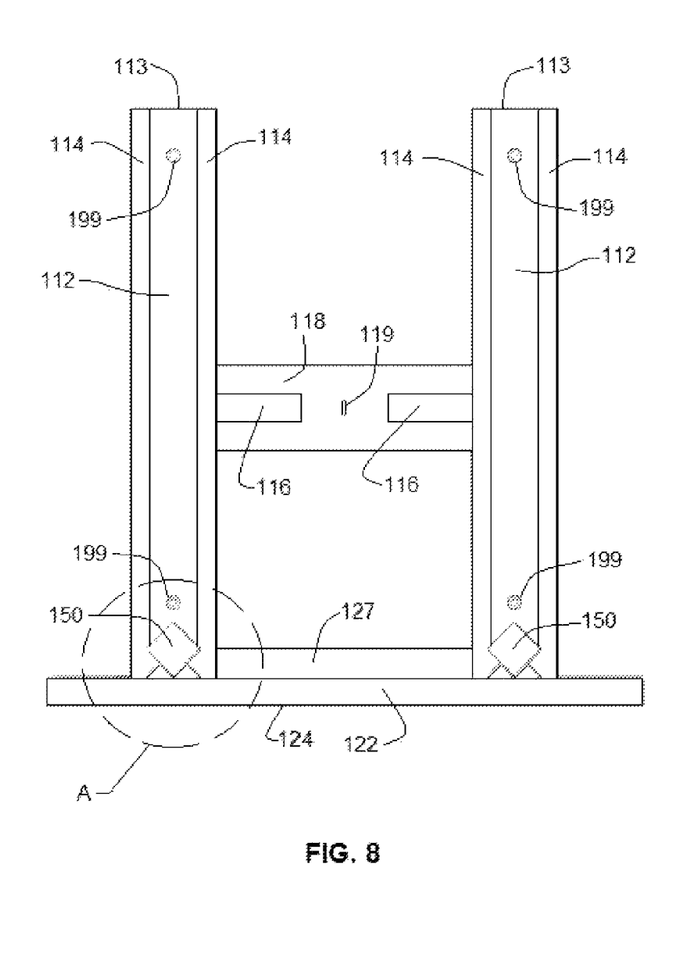
FIG. 8 is a front elevation view of the example hauling apparatus of FIG. 3 according to certain example embodiments.
Figure 8A:
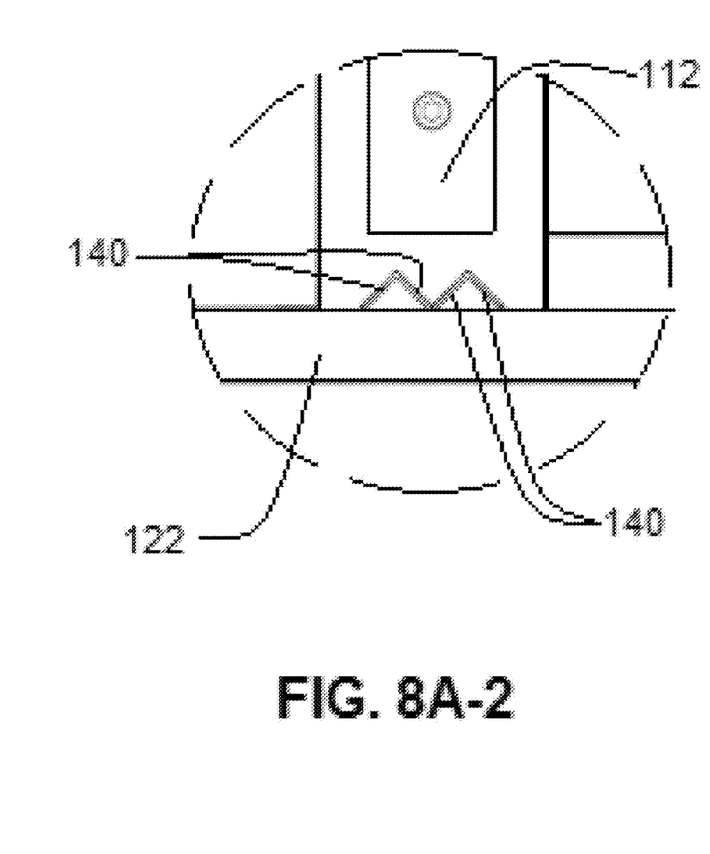
Figure 8A:
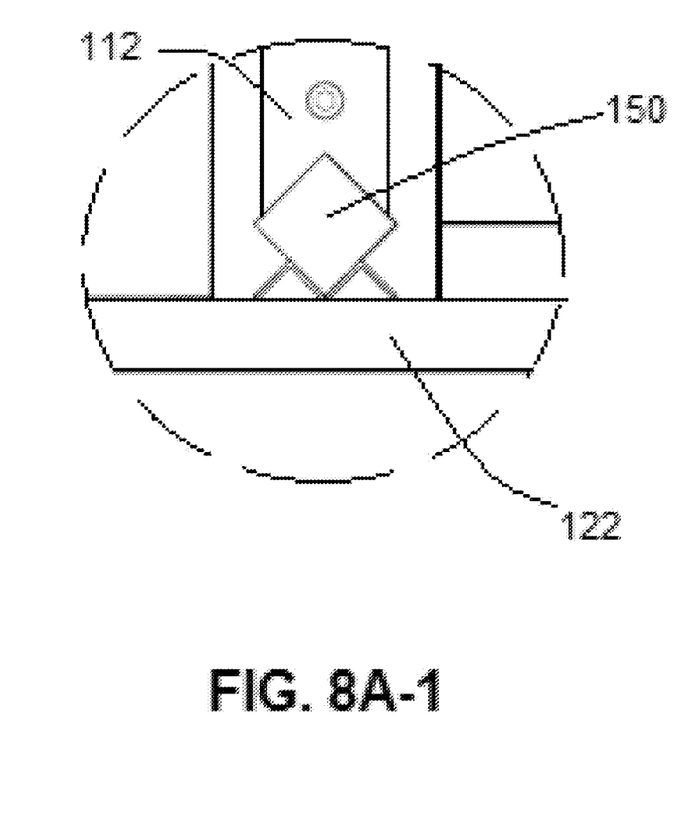

Example embodiments of specific apparatus used in the system will now be described. Turning to FIGS. 3-8 with first emphasis on FIG. 4, depicted is an example rack 100 comprising an abutment structure 110 having one or more abutment surfaces 112, the abutment structure 110 attached to or with a base 120 supporting support members 150 on which relatively large, heavy objects with curved outer surfaces may be placed. As depicted in FIGS. 3 and 5, such a rack 100 may be readily placed with its lower surface 124 directly on a conventional flatbed trailer 20, such as those pulled by semi tractors or trucks 25. The abutment structure 110 is designed to be located toward the front of the trailer 20, i.e., the side toward the truck 25 that is pulling the trailer 20. This is so the reinforced abutment structure 110 can resist the forward momentum of the cargo attached thereto in the event of sudden deceleration such as typically occurs in a traffic accident, thereby tending to protect the driver of the truck 25. The example embodiment shown herein could be constructed in any number of alternate geometries as would be apparent to a person of skill in the mechanical engineering arts. Accordingly, the present invention is not limited to the example geometry shown. The example abutment structure 110 shown in the figures comprises vertically oriented abutment surfaces 112 that may comprise, for instance, pieces of conventional two-by-four lumber attached to a strong, rigid backing members 114 such as C6×13 American Standard Steel Channel, for instance by countersunk fasteners 199, such as carriage bolts, as shown in FIG. 8. The backing members 114 may be welded or otherwise affixed to the base 120 of the frame 100 and extend from the base structure 120 upward to an upper surface 113 that is selected to be sufficiently high to support the cargo. The example abutment structure 110 further comprises a tensioner attachment structure 118 having means for attaching a tensioner thereto, such as a ratcheting mechanism 40. That means may comprise the edge of steel channel forming the structure 118 (as shown in FIG. 2), or an eye-bolt 119 (as shown in FIGS. 6 and 8), or any other suitable means. The tensioner attachment structure 118 may be formed from any suitably strong material, such as the same material used for backing members 114, and may be welded or otherwise attached with the backing members 114 at an appropriate location for securing the cargo, and extend forward away therefrom, thereby creating space for a shortening or retracting mechanism, such as a ratcheting mechanism 40, as shown in FIG. 2. While the example rack 100 described herein is mostly a one-piece weldment, it could also comprise removably fastened portions, for instance to allow vertical adjustment of the location of the tensioner attachment structure 118 for different cargo sizes. To strengthen the abutment structure 110 several reinforcement members 116, 127 may be provided and arranged as needed, which may be formed from any suitably strong material in any suitably strong geometries, such as C3×6 American Standard Steel Channel. With reference to FIGS. 4 and 6, the base 120 of the rack 100 may extend from a back end 126 to a front end 128 and may comprise substantially parallel and co-planar longitudinally-extending members 121 separated and intersected by cross-members 122 that may extend laterally outward beyond the longitudinally extending members 121. The cross-members 122 may be provided with through holes 129 formed in their distally outward extending portions, as shown in FIG. 6. The through holes 129 may be adapted to engage attachment means for attaching the rack 100 to a trailer 20, such as chains 130 as shown in FIG. 2. Alternatively, the holes 129 may instead comprise tabs, brackets, or any other engagement means suitable for whatever attachment means is used, such as straps, cables, fasteners, brackets, interlocking protrusions, or any other suitably strong fastening means. Additional reinforcing members 123 may also be provided extending between and attached to the longitudinally-extending members 121. The longitudinally-extending members 121 and cross-members 122 may be formed from any suitably strong material, such as the same material used for backing members 114, and may be welded or otherwise attached together. Likewise, the reinforcing members 123 may be formed from any suitably strong material, such as the same material used for reinforcement members 116, and may be welded or otherwise attached to the longitudinally-extending members 121. In one embodiment where the cross-members 122 are formed from C6×13 American Standard Steel Channel or similar sized and shaped material, the rack 100 may be easily loaded and unloaded from a trailer 20 by sliding forklift forks into the open spaces defined by the cross-sections of cross-members 122, and lifting the rack 100.

Additional features that may be present in various example embodiments of the rack apparatus 100 include cargo support members 150 that may be positioned and supported by one or more support positioners 140, as best shown in FIGS. 8, 8A-1, and 8A-2. Cargo support members 150 may comprise conventional four-by-four pieces of wood. However, unlike typical placement of wood pieces 15 as depicted in FIG. 1, the present system may tilt the support members 150 about their longitudinal axes, for instance as illustrated in FIGS. 2, 8, and 8A-1, to avoid the high pressure created by pressing the corners or edges of support members 15 into the outer diameter 13 of the cargo 10, as depicted in FIG. 1. The present apparatus and system thus allows the use of standard materials, such as conventional four-by-four pieces of wood, to act as support members 150 with their flat surfaces more tangential to the outer diameter 13 of the cargo 10, for instance as illustrated in FIGS. 2, 8, and 8A-1. This may be accomplished by providing support positioners 140 that position the support members 150 at any desired angle, an example of which is illustrated in FIGS. 2, 8, 8A-1, and 8A-2. FIG. 8A-2 best shows an end view of an example of support positioners 140, with support member 150 removed for clarity. In one example embodiment, support positioners 140 may be simply and inexpensively constructed from two pieces of angle iron, such as standard steel 1½"×1½" angle iron, positioned adjacent one another with the interior angles of each piece facing down, with two such pieces welded or otherwise attached to the top of each longitudinally extending member 121 of the base 120 of the rack 100. This creates a right-angle "valley" symmetrical about a vertical axis between the adjacent pieces of angle iron, into which the support member 150 may be placed, and attached by fasteners or other suitable attachment means if desired. Alternatively, the support members 150 may be left unsecured sitting in the support positioners 140 to facilitate easy replacement, since the weight of the cargo will hold them in place. It is understood that this is just one example geometry and construction of support positioners 140 and support members 150, and any other suitable geometries, constructions, and materials may be used, as would be apparent to one of skill in the art.

Another apparatus forming part of the hauling system 1000 in certain example embodiments is the movable member 200, shown in FIGS. 2, 9, and 10. The movable member 200 is adapted to be attached to the abutment structure 110 of the rack 100 by retracting means, which in the example embodiment shown is conventional chain 30 attached to a conventional chain binder such as a lever chain binder or a ratcheting chain binder 40. In other embodiments the chain 30 could be replaced with one or more straps, cables, ropes, steel bars or other metal structures, or any other suitably strong means, and the ratcheting chain binder could be replaced with any other mechanisms or means capable of securely drawing the movable member 200 toward the abutment structure 110. The movable member 200 is further adapted to press up against the cargo 10 and securely compress the cargo 10 together and against the abutment structure 110 when the retracting means (e.g., 30, 40) is attached to the abutment structure 110 and movable member 200 and is retracted. The movable member 200 may comprise one or more abutment surfaces 212, such as conventional two-by-four pieces of wood, which may be attached to an appropriately-sized, sufficiently strong and rigid backing member 210, for instance with conventional carriage bolts 299 countersunk into the abutment surfaces 212, as shown in FIGS. 9 and 10. The rigid backing member 210 may be formed from any suitably strong material, such as the same material used for backing members 114. The movable member 200 may further comprise means adapted to attach with the retracting means (e.g., 30, 40). That attachment means may comprise an eye-bolt 219 (as shown in FIGS. 9 and 10), or any other suitable means, which would typically be centrally located in the movable member 200.

Example methods of using the hauling system 1000 will now be described. In a first step, an example rack 100 as described herein is provided. The rack 100 may be inspected to ensure that abutment surfaces 112 and support members 150 are in place and not damaged. The rack 100 may be picked up, for instance by a forklift, overhead pulley, crane, or any other suitable means, and placed on a flatbed trailer, train car, storage rack, a floor, the ground, or any other suitable surface or structure 20. The front 128 of the rack 100 is positioned toward the primary direction of travel of the structure 20 on which it is placed. The rack 100 is removably attached to the structure 20 on which it has been placed using conventional methods, for instance by chaining or otherwise securing it to a flatbed trailer using through holes 129, as shown in FIG. 2. One or more relatively large, heavy objects, and in particular heavy objects with curved outer surfaces, such as metal coils, pipes, structures, concrete shapes, and the like (i.e., "cargo"), is picked up, for instance by a forklift, overhead pulley, crane, or any other suitable means, and placed on support members 150, adjacent each other and adjacent abutment surfaces 112. Where the cargo includes an open portion centrally located in the cargo, the cargo may be picked up and moved by placing the lifting means inside the open portion of the cargo and picking it up by the cargo's inner surface, such as inner diameter 12 of metal coils 10 as shown in FIG. 2. In this example embodiment a movable member 200 is provided, and inspected to ensure that abutment surfaces 212 and attachment means 219 are in place and not damaged. The movable member 200 is placed adjacent the cargo that has been loaded onto the rack 100, opposite the side of the cargo that is adjacent the abutment structure 110. Where the cargo includes an open portion centrally located in the cargo, the movable member 200 is positioned so that the attachment means 219 is proximate the centrally-located open portion in the cargo. Retracting means is provided, and inspected to ensure it is functioning, not frayed or otherwise damaged. The retracting means in the example embodiment shown is conventional chain 30 attached to a conventional chain binder such as a lever chain binder or a ratcheting chain binder 40. In other embodiments the chain 30 could be replaced with one or more straps, cables, ropes, steel bars or other metal structures, or any other suitably strong means, and the ratcheting chain binder 40 could be replaced with any other mechanisms or means capable of securely drawing the movable member 200 toward the abutment structure 110. One end of the retracting means is attached to either the tensioner attachment structure 118 of the abutment structure 110 or the attachment means 219 of the movable member 200, and the other end of the retracting means is attached to the other (219 or 118, respectively). In the example embodiment shown, the ratcheting chain binder 40 or other mechanism or means that will be used to securely draw the movable member 200 toward the abutment structure 110 is placed on the abutment structure 110 side of the cargo. This could be reversed in other embodiments. The movable member 200 is approximately centered against the cargo, and the retracting means is approximately centered within the open portion centrally located in the cargo sufficiently so that it will not touch the cargo when the retracting means is retracted, and the ratcheting chain binder 40 or other retracting mechanism is actuated, securely drawing the movable member 200 toward the abutment structure 110, thereby forcing the cargo toward the abutment structure 110 and rigidly affixing the cargo together and sandwiching the cargo between the opposing abutment surfaces, 112, 212, safely restraining the cargo so that it cannot move appreciably relative to itself or to the mating abutment surfaces 112, 212, while the retracting means does not touch the cargo. The system 1000 is shipped or otherwise hauled, after which the cargo is unloaded by executing some or all of the above steps in reverse order, after which the process may be repeated. It has been found that this process is materially faster and easier for users to learn and use than conventional techniques for loading and unloading such cargo from flatbed trailers, as well as increasing user safety and significantly reducing incidents and severity of cargo damage.

The above devices, structures, methods, and functionalities are set forth to illustrate general concepts. Numerous other devices, structures, methods, and functionalities, and combinations and permutations thereof, are contemplated, and are inherently and necessarily disclosed to persons of ordinary skill in the art by the description and drawings herein.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

What is claimed is:

1. A hauling system adapted to securely transport on a standard flatbed trailer a plurality of objects up to several feet across having open center portions and curved outer surfaces and weighing up to thousands of pounds each, the system comprising:
    a first apparatus adapted to be removably attached to a flatbed trailer, the first apparatus comprising an abutment structure having one or more first abutment surfaces extending upward from a front portion of a longitudinally extending base that is adapted to securely carry proximate to the one or more first abutment surfaces a plurality of adjacent objects up to several feet across that have curved outer surfaces and weigh up to thousands of pounds each, the abutment structure further comprising a first tensioner attachment structure;
    a second apparatus comprising a longitudinally extending movable member having one or more second abutment surfaces and a second tensioner attachment structure;
    a tensioner structure adapted to attach to the first and second tensioner attachment structures and to pull the movable member toward the abutment structure thereby securing the objects between the one or more first abutment surfaces and second abutment surfaces, the tensioner structure further adapted to pass through the open center portions of the objects without touching the objects when the objects are placed adjacent each other on the base proximate the one or more first abutment surfaces and the movable member is placed proximate the side of the objects opposite the side proximate the one or more first abutment surfaces, and when the tensioner structure is attached to the first and second tensioner attachment structures and pulls the movable member toward the abutment structure thereby securing the objects between the one or more first abutment surfaces and second abutment surfaces;
    wherein the base further comprises cargo support members extending longitudinally about longitudinal axes and adapted to have the objects rest thereon, the cargo support members having substantially flat surfaces that are rotated at non-level angles about each cargo support member's longitudinal axis.

2. The hauling system of claim 1, wherein the base further comprises support positioners that position the support members at the non-level angle.

3. The hauling system of claim 1, wherein the cargo support members comprise standard four-by-four pieces of lumber.

4. The hauling system of claim 2, wherein each support positioner comprises two adjacent pieces of angle iron.

5. The hauling system of claim 1, wherein any of the first or second abutment surfaces comprises a standard two-by-four piece of lumber.

6. The hauling system of claim 1, wherein the tensioner structure comprises a chain and a chain binder.

7. The hauling system of claim 6, wherein the chain binder is a ratcheting chain binder.

8. The hauling system of claim 1, wherein the objects the system is adapted to haul are metal coils.

9. A hauling apparatus adapted to securely transport on a standard flatbed trailer a plurality of objects up to several feet across having open center portions and curved outer surfaces and weighing up to thousands of pounds each, the apparatus adapted to be removably attached to a flatbed trailer, the apparatus comprising:
    an abutment structure having one or more first abutment surfaces extending upward from a front portion of a longitudinally extending base that is adapted to securely carry proximate to the one or more first abutment surfaces a plurality of adjacent objects up to several feet across that have curved outer surfaces and weigh up to thousands of pounds each;

the abutment structure further comprising a first tensioner attachment structure adapted to pull a movable member toward the abutment structure and thereby secure the objects between the one or more first abutment surfaces and the movable member when the first tensioner attachment structure is connected with a tensioner that passes through the open center portions of the objects without touching the objects when the objects are placed adjacent each other on the base proximate the one or more first abutment surfaces and the movable member is placed proximate the side of the objects opposite the side proximate the one or more first abutment surfaces, and when the first tensioner attachment structure is also attached to the movable member and pulls the movable member toward the abutment structure;

wherein the base further comprises cargo support members extending longitudinally about longitudinal axes and adapted to have the objects rest thereon, the cargo support members having substantially flat surfaces that are rotated at non-level angles about each cargo support member's longitudinal axis.

10. The hauling apparatus of claim 9, wherein the base further comprises support positioners that position the support members at the respective non-level angle.

11. The hauling apparatus of claim 9, wherein the cargo support members comprise standard four-by-four pieces of lumber.

12. The hauling apparatus of claim 10, wherein each support positioner comprises two adjacent pieces of angle iron.

13. The hauling apparatus of claim 9, wherein the one or more first abutment surfaces comprises a standard two-by-four piece of lumber.

14. The hauling apparatus of claim 9, wherein the objects the apparatus is adapted to haul are metal coils.

15. A method of securely transporting in a forward direction on a standard flatbed trailer a plurality of objects up to several feet across each having an open center portion and curved outer surface and weighing up to thousands of pounds each, the method comprising the steps of:

providing a system comprising:

a first apparatus adapted to be removably attached to said flatbed trailer, the first apparatus comprising an abutment structure having one or more first abutment surfaces extending upward from a front portion of a longitudinally extending base that is adapted to securely carry proximate to the one or more first abutment surfaces a plurality of said objects adjacent to each other, the abutment structure further comprising a first tensioner attachment structure;

a second apparatus comprising a longitudinally extending movable member having one or more second abutment surfaces and a second tensioner attachment structure;

a tensioner structure adapted to attach to the first and second tensioner attachment structures and to pull the movable member toward the abutment structure to thereby secure said objects between the first and second abutment surfaces, the tensioner structure further adapted to pass through the open center portion of each of said objects without touching said objects when said objects are placed adjacent each other on the base proximate the one or more first abutment surfaces and the movable member is placed proximate the side of said objects opposite the side proximate the one or more first abutment surfaces, and when the tensioner structure is attached to the first and second tensioner attachment structures and pulls the movable member toward the abutment structure thereby securing said objects between the first and second abutment surfaces;

lifting and moving the first apparatus with a forklift and placing the first apparatus on said flatbed trailer;

removably attaching the first apparatus to said flatbed trailer;

placing one or more of said objects adjacent each other and proximate the one or more first abutment surfaces;

placing the movable member proximate the side of said adjacent objects opposite the side proximate the one or more first abutment surfaces;

passing the tensioner structure through the open center portion of each of said adjacent objects and attaching the tensioner structure to the first and second tensioner attachment structures; and pulling the movable member toward the abutment structure, thereby securing said adjacent objects between the one or more first abutment surfaces and second abutment surfaces without the tensioner structure touching said adjacent objects.

16. The method of claim 15, wherein said objects are metal coils.

17. The method of claim 15, wherein the step of placing the first apparatus on said flatbed trailer comprises orienting the first apparatus so that its front portion faces in the forward direction of travel of said trailer.

\* \* \* \* \*